US009475939B2

(12) United States Patent
Abdul et al.

(10) Patent No.: US 9,475,939 B2
(45) Date of Patent: Oct. 25, 2016

(54) POLYMER FOR CONTACT LENSES

(75) Inventors: Rashid Abdul, Bellshill (GB); Neil Bonnette Graham, Bellshill (GB)

(73) Assignee: OCUTEC LIMITED, Bellshill (GB)

( * ) Notice: Subject to any disclaimer, the term of this patent is extended or adjusted under 35 U.S.C. 154(b) by 119 days.

(21) Appl. No.: 13/821,154

(22) PCT Filed: Oct. 24, 2011

(86) PCT No.: PCT/GB2011/001527
§ 371 (c)(1),
(2), (4) Date: Jul. 3, 2013

(87) PCT Pub. No.: WO2012/056195
PCT Pub. Date: May 3, 2012

(65) Prior Publication Data
US 2013/0274370 A1    Oct. 17, 2013

(30) Foreign Application Priority Data

Oct. 27, 2010 (GB) .................................. 1018190.7

(51) Int. Cl.
| C08L 71/02 | (2006.01) |
| C08L 75/04 | (2006.01) |
| C08G 18/10 | (2006.01) |
| C08G 18/12 | (2006.01) |
| C08L 75/08 | (2006.01) |
| C08G 18/48 | (2006.01) |
| G02B 1/04 | (2006.01) |

(52) U.S. Cl.
CPC ............... C08L 75/08 (2013.01); C08G 18/10 (2013.01); C08G 18/12 (2013.01); C08G 18/4833 (2013.01); G02B 1/043 (2013.01); C08G 2210/00 (2013.01)

(58) Field of Classification Search
None
See application file for complete search history.

(56) References Cited

U.S. PATENT DOCUMENTS

| 3,051,687 | A | * | 8/1962 | Young | C08G 18/10 525/415 |
| 3,267,077 | A | * | 8/1966 | Von Brachel | C08G 18/10 521/156 |
| 3,322,568 | A | | 5/1967 | Golodner | |
| 3,428,710 | A | * | 2/1969 | Lautenschlager | C08G 18/10 524/377 |
| 3,786,034 | A | * | 1/1974 | Blair et al. | C08G 18/48 264/2.6 |
| 4,644,033 | A | * | 2/1987 | Gnanou | C08G 18/4833 524/590 |
| 5,118,779 | A | * | 6/1992 | Szycher | A61K 9/2031 424/401 |
| 5,175,229 | A | * | 12/1992 | Braatz | C08G 18/10 428/423.1 |
| 5,789,461 | A | * | 8/1998 | Nicolson | A61L 27/26 264/1.36 |
| 6,930,196 | B2 | * | 8/2005 | Carlson | C08G 18/10 252/182.22 |
| 2002/0013426 | A1 | * | 1/2002 | Toyofuku | C08G 18/12 525/452 |
| 2002/0198328 | A1 | * | 12/2002 | L'alloret | A61K 8/91 525/326.7 |
| 2003/0199644 | A1 | * | 10/2003 | Kim | C08G 18/4018 525/453 |
| 2009/0012208 | A1 | * | 1/2009 | Madsen | A61L 15/585 523/113 |

FOREIGN PATENT DOCUMENTS

FR    2539135 A1    7/1984

* cited by examiner

*Primary Examiner* — Peter A Salamon
(74) *Attorney, Agent, or Firm* — Foley & Lardner LLP

(57) ABSTRACT

The present invention relates to a polyurethane polymer composition prepared by reacting a mixture comprising: a} at least one polyethylene glycol, and either b) at least one poly-isocyanate, having a functionality greater than 2 or c) at least one di-isocyanate and at least one polyol or at least one macropolyol having a functionality greater than 2, wherein the polyol or macropolyol is present at an amount of 0.1 to 9 wt % of the mixture. The invention also relates to a process for preparing a polyurethane xerogel in the form of a molded article, said process comprising the steps of: i.) preparing said mixture; ii.) dispensing the reaction mixture formed in step i) into a mold; iii.) allowing the reaction mixture to react and cure; iv.) removing the molded article from the mold; and v.) hydrating the molded article.

9 Claims, No Drawings

POLYMER FOR CONTACT LENSES

CROSS-REFERENCE TO RELATED APPLICATIONS

This application is a U.S. national stage application under 35 USC. 371 of co-pending International Application No. PCT/GB2011/001527, filed on Oct. 24, 2011, and entitled, "POLYMER FOR CONTACT LENSES," which in turn claims the benefit of and priority to Great Britain Patent Application No. 1018190.7, filed on Oct. 27, 2010, both of which are incorporated by reference herein in their entirety for all purposes.

The present invention relates to poly(ethylene glycol), PEG based polyurethane polymers that have applications in the field of contact lens technology. The invention also relates to a process for preparing such materials, which can desirably and preferably be prepared in the complete absence of solvents.

BACKGROUND TO THE INVENTION

Soft contact lenses offer a viable alternative to spectacles for the correction of visual defects such as myopia, hypermetropia and astigmatism. Early hydrogel lenses are derived almost exclusively from hydrophilic monomers such as 2-hydroxyethyl methacrylate, (HEMA). Although these lenses provided some comfort, they did not provide sufficient oxygen permeability to prevent problems associated with corneal hypoxia. Attempts to address this problem included co-polymerising HEMA with hydrophilic monomers such as methacrylic acid and N-vinyl pyrrolidone. Although these polymers increased the level of oxygen permeability, the incorporation of these co-monomers also leads to problems such as protein and lipid deposition, corneal desiccation, staining and lens dehydration.

More recently, a new generation of polymers has been developed to further increase the level of oxygen. These materials are based on the co-polymerisation of silicone methacrylates with hydrophilic co-monomers. The lenses produced from these materials were originally designed for extended wear, though daily wear products also exist now. Although successful in further increasing the oxygen permeability, these new materials still suffer from limitations such as lipid binding and dryness, all of which decrease lens on eye comfort.

There is therefore still a need for new contact lens polymers, which offer sufficient oxygen levels for normal corneal metabolism during daily wear and for extended wear, and which provide a high level of comfort throughout the day.

One class of polymers which holds considerable promise for novel contact lens materials are PEG based polyurethanes.

Urethane chemistries have also been widely investigated in the field of biomedical devices. For example, U.S. Pat. No. 3,786,034 discloses hard, hydrophilic polyurethane materials formed from reacting a specific polyol with a polyfunctional isocyanate. U.S. Pat. No. 3,821,486 teaches similar such materials. Likewise, U.S. Pat. No. 4,136,250 teaches a polymer formed by reacting a high molecular weight polydimethyl siloxane diol with 2 mole equivalents of isophorone di-isocyanate and then reacting with excess hydroxyl-containing monomers. Further urethane copolymers are disclosed in U.S. Pat. No. 4,454,309 and U.S. Pat. No. 4,359,553.

U.S. Pat. No. 6,930,196 discloses polyurethane hydrogel contact lenses prepared from prepolymers made by reacting (a) at least one multifunctional compound; (b) at least one di-isocyanate; and (c) at least one diol. The prepolymers so formed are then reacted with excess water to form a hydrogel polymer suitable for use as a contact lens.

U.S. Pat. No. 4,644,033 discloses a polyurethane hydrogel formed from the reaction of a polyoxyethylene and a polyfunctional isocyanate in a non-aqueous solvent. The materials can be molded into contact lenses.

U.S. Pat. No. 5,932,200 discloses polyurethane formed from reacting a diol component and an organic di-isocyanate with critical selection of the amount of water in the reaction mixture and the diol component. The polyurethane is in the form of a gel that has applications in burn/wound care dressings and as surgical implants.

U.S. Pat. No. 4,885,966 and U.S. Pat. No. 5,175,229 disclose hydrophilic polymeric soft contact lenses prepared from prepolymers that are isocyanate-capped oxyethylene-based diols or polyols having a molecular weight of about 7000 to 30,000, wherein essentially all of the OH groups are capped with isocyanate. The prepolymers are hydrated to form polyurea-polyurethane polymers that are characterised by having a non-ionic surface which is resistant to non-specific protein adsorption.

It is well known anecdotally that poly(ethylene glycol) based polyurethane copolymers are associated with poor storage stability. Known polyurethane polymers generally do not consistently maintain their properties after 6 months storage. The stability of polymers forming medical devices is clearly paramount. The properties of materials used in the manufacture of medical devices must be maintained upon extended periods of storage. The properties of such materials must be predictable and consistent. Materials having low and/or inconsistent storage stability are not suitable for use in the manufacture of medical devices such as contact lenses, regardless of any other promising properties.

The present invention seeks to provide new polyoxyethylene based polyurethane materials that are suitable for use in the contact lens industry. Ideally, the polyoxyethylene polyurethane-based materials of the invention exhibit exemplary physical properties, in particular, in terms of storage stability.

STATEMENT OF INVENTION

According to a first aspect of the present invention there is provided a polyurethane polymer composition prepared by reacting a mixture comprising:
  a) at least one polyethylene glycol, and either
  b) at least one poly-isocyanate, having a functionality greater than 2 or
  c) at least one di-isocyanate and at least one polyol or macropolyol having a functionality greater than 2, wherein the polyol or macropolyol is present at an amount of 0.1 to 9 wt % of the mixture.

According to one embodiment, the mixture includes very low levels of compounds containing tertiary hydrogen atoms (see definition below). Generally the mixture contains less than 5 wt % of such compounds, typically less than 2 wt %, suitably less than 0.5 wt %; preferably the mixture does not contain such compounds.

Surprisingly, the polymers of the present invention exhibit far better storage stability than polyurethane copolymers containing tertiary hydrogen atoms provided from a polypropylene glycol copolymer. Whilst the applicant does not wish to be bound by any theory, it is believed this may be due to the fact that the reactant mixture comprises very low amounts of tertiary hydrogen atoms. Such tertiary hydrogen atoms are a potential source of rapid oxidation, through the generation of peroxide, resulting in chain scission. By eliminating or greatly reducing the amount of tertiary hydrogen atoms in the reactants, the polymers of the present invention are less susceptible to oxidative degradation and are associated with far higher storage stability. In addition, the incorporation of significant amounts of tertiary hydrogen atom containing reactants (e.g. propylene glycol, PG, or polypropylene glycol, PPG) in the mixture is associated with undesirable elevated surface contact angles in the resultant polymer. As such, a further important advantage of the polymers of the present invention is their low surface contact angles against water.

The reactant mixture does not generally include significant amounts of any propylene glycol (PG) or polypropylene glycol (PPG). Generally the mixture contains less than 5 wt % PG and/or PPG. This is highly advantageous as PG and PPG include tertiary hydrogen atoms and the inclusion of significant amounts of PG and for PPG is believed to reduce the storage stability of resultant polyurethane polymer compositions, and is believed to cause the resultant polyurethane polymer compositions to have elevated surface contact angles.

According to a second aspect of the present invention there is provided a process for preparing a polyurethane hydrogel, said process comprising:
  i. preparing a mixture of at least one polyethylene glycol, and either
    a) at least one poly-isocyanate having a functionality greater than 2, or
    b) at least one di-isocyanate and at least one polyol or macropolyol having a functionality greater than 2, wherein the polyol or macropolyol is present at an amount of 0.1 to 9 wt % of the mixture;
  ii. allowing the mixture formed in step i) to react appropriately to form a cross-linked polyurethane xerogel;
  iii. hydrating the xerogel using an aqueous medium to form a hydrogel.

Typically the mixture of step i. includes very low levels of compounds containing tertiary hydrogen atoms (see definition below). Generally the mixture of step i. includes less than 5 wt % of such compounds, suitably less than 2 wt %, typically 0.5 wt % or less, preferably the mixture does not contain any of such compounds.

A third aspect of the invention relates to a polymer obtainable by the above described process.

A fourth aspect of the present invention relates to a process for preparing a contact lens comprising the steps of:
  i) preparing a mixture of at least one polyethylene glycol, and either
    a) at least one poly-isocyanate having a functionality greater than 2, or
    b) at least one di-isocyanate and at least one polyol or macropolyol having a functionality greater than 2, wherein the polyol or the macropolyol is present at an amount of 0.1 to 9 wt % of the mixture;
  ii) dispensing the reaction mixture formed in step i) into a contact lens mold;
  iii) allowing the reaction mixture to react and cure (generally with the assistance of energy, in particular thermal energy or other means of radiation);
  iv) removing the contact lens from the mold; and
  v) hydrating the contact lens, optionally in the presence of a surface active agent, such as a polysorbate compound.

Generally the reaction mixture is liquid at ambient temperature and may be dispensed at ambient temperature (20 to 30° C.) or slightly higher (up to 40° C.).

A fifth aspect of the present invention relates to an article of manufacture comprising a polymer as described above.

A sixth aspect of the present invention relates to the use of a polymer as described above in the preparation of a contact lens.

DETAILED DESCRIPTION

Definitions

The "functionality" of the poly-isocyanate compound refers to the number of NCO groups present in the poly-isocyanate compound.

The term "small alkyl group" refers to an alkyl group having a carbon backbone of 1 to 6 carbon atoms, typically 1 to 4 carbon atoms.

The term "contact angle" is used to refer to the angle a fluid makes with the surface of the material, for instance the angle the sides of a droplet of water make when formed on the surface of the material. Contact angle can also be measured by measuring the angle the sides of an air bubble make when formed on the surface of the material underwater.

"Polyfunctional" is generally used to refer to a molecule, or a mixture of molecules having more than 2 functional groups that are capable of reacting in the system.

"DK" is a measure of the oxygen permeability of a material provided in Barrer units where 1 Barrer=$10^{-11}$ $cm^2 \cdot mL \cdot mmHg$.

The term "tertiary hydrogen atom" is used to refer to a hydrogen atom attached to a carbon atom having three substituents other than hydrogen where one of the three substituents is oxygen.

The term "hydrogel" is used herein to refer to a polymer comprising 10 wt % or more water. A hydrogel in an aqueous medium will absorb water and retain its original dry shape but it will be enlarged. It will not dissolve in water to form a fluid solution unless it is significantly degraded.

The term "xerogel" is used herein to refer to a polymeric material which may form a hydrogel upon contact with sufficient water. Generally a xerogel is dry and comprises less than 5 wt % water.

The term "substantially anhydrous" is used herein to refer to conditions in which the amount of water is sufficiently low so as to produce a polyurethane backbone that is substantially free from urea groups. Preferably the amount of water in the reactant mixture is less than about 0.3 wt. %, more preferably less than about 0.1 wt. %, even more preferably less than about 0.05 wt. %.

"Diol" is referred to herein as a compound having 2 available hydroxyl groups.

Polyol is referred herein as a compound having more than 2 available hydroxyl groups. Polyols generally have a molecular weight less than or equal to 1000.

Macropolyol is generally used to refer to a compound having more than two available hydroxyl groups linked to polyethylene oxide and/or polypropylene oxide homo or copolymer and generally has a molecular weight greater than 1000.

Polymer Composition

As noted above, the present invention provides a polyurethane polymer composition prepared by reacting a mixture comprising:

a) at least one polyethylene glycol, and either
b) at least one poly-isocyanate, having a functionality greater than 2 or
c) at least one di-isocyanate and at least one polyol or macropolyol having a functionality greater than 2, wherein the polyol or macropolyol is present at an amount of 0.1 to 9 wt % of the mixture.

The amount of tertiary hydrogen atoms in the reactant mixture is minimised or eliminated, thus minimising or eliminating a potential source of chain scission and maximising the storage stability of the resultant polymer composition.

The removal of the tertiary hydrogens in compositions containing PPG (or PG) presumably eliminates a source of oxidation leading to degradation and poor storage stability. One of the important improvements attributable to the present invention (amongst others) is that removal or drastic reduction of PG and/or PPG from the composition. This results in a corresponding removal or drastic reduction in the presence of tertiary hydrogen atoms which act as a potential source of chain scission.

It is well known anecdotally that PEG based contact lens materials substantially fail because of poor storage stability. No solution to this problem has currently been proposed. This has resulted in the lack of commercialisation of PEG polymer based contact lenses which have other very promising qualities (previously reported in patents such as U.S. Pat. No. 6,930,196). The present invention provides an effective solution to the stability problem, and represents a major contribution to the knowledge in the art towards utilising PEG composition in the field of contact lenses. The reactant mixture may contain 9 wt % or less compounds which comprise tertiary hydrogen atoms, generally 5 wt or less, suitably 4 wt % or less, typically 2 wt % or less, typically 0.5 wt % or less, preferably the mixture does not contain any of such compounds.

The reactant mixture does not generally include any PG or PPG, in particular the reactant mixture does not generally include any PPG. As such the amount of tertiary hydrogen atoms in the reactant mixture is minimised or eliminated.

According to a further aspect of the present invention there is provided a contact lens formed from the polymer composition. The properties of such a contact lens are extremely promising.

The contact lens of the present invention generally has an associated surface energy which is surprisingly low, and a surprisingly low contact angle, typically 40° or less, generally 30° or less, suitably around 25°. Such attributes are commonly associated with improved comfort and decreased risk of infection. Contact lenses formed from the polymer of the present invention generally have a water content of 50 to 75 wt %, typically around 60 wt %, and this is considered desirable in terms of the industry standard. The oxygen permeability of contact lenses formed from the polymer of the present invention is generally at least as high, or higher than most hydrogel contact lenses. The DK value of the polymer of the present invention is typically 20 to 40 Barrer, generally 25 to 35 Barrer, suitably around 30 Barrer. The tensile properties of the lenses are also good, with the modulus typically 0.4 to 0.6 MPa, generally around 0.5 MPa. The storage stability of such lenses is also expected to be better than known PEG lenses as the amount of tertiary hydrogens in the compositions of the present invention is relatively very low, and tertiary hydrogen atoms are potentially a cause of poor storage stability.

Polyethylene Glycol

The present invention involves the use of at least one polyethylene glycol (PEG).

Suitably the PEG has a molecular weight of about 200 to about 30,000, more suitably from about 500 to about 20,000, generally about 500 to about 2000. According to one aspect of the present invention the PEG has a molecular weight of less than 1500, typically less than 1200, generally less than 1000. The PEG may have a molecular weight of about 500 to about 1000, suitably about 700 to about 900, more suitably about 800.

In one preferred embodiment, the PEG is selected from PEG 200, PEG 400, PEG 600, PEG 800, PEG 1000, PEG 1200 and PEG 1500. The numbers after the letters PEG refer to their number average molecular weights.

According to one embodiment of the present invention, all PEG compounds used to form the composition of the present invention have a molecular weight of 1500 or less.

In addition, a cross-linked polyurethane composition of the present invention comprising hard domains/blocks at a relatively short distance within the polymer chains may exhibit phase separation which induce light scattering, for instance due to the Tyndall effect particularly following exposure to elevated temperatures, for instance during a steam sterilisation process. Accordingly, the skilled man would have been discouraged from the use of such systems. But by using the process described in this invention one can eliminate the occurrence of the light scattering causing the Tyndall effect, thereby making the lenses transmit the light more effectively.

According to a further embodiment of the present invention, the composition comprises a first PEG as described above, and a second PEG. The molecular weight of the second PEG is generally greater than that of the first PEG. Typically, the second PEG has a molecular weight of about 1000 to about 20000, generally about 2000 to about 20000, suitably from about 3000 to about 10000, more suitably 5000 to about 8000.

According to one embodiment of the present invention, the second PEG is selected from the group consisting of PEG 6000, PEG 3350 (where the numbers represent the number average molecular weight).

Advantageously, the use of the PEG of the present invention gives rise to a liquid reaction mixture in which all of the reaction components and additives are maintained in the fluid state for subsequent dispensing into moulds at the ambient temperature or just above the ambient temperature (where ambient temperature is 20 to 30° C.). The mixture is then allowed to react and cure (complete reaction), generally with the assistance of an input of energy, in particular thermal energy (e.g., heat).

Typically, the use of the PEG compound of the present invention provides a relatively low viscosity reaction mixture, allowing the mixture to be dispensed in a liquid form at ambient temperature, or just above. The relatively low viscosity of the mixture promotes homogeneity of the mixture and allows the reactants to mix rapidly and uniformly, optimising the consistency of the composition formed. Decreased viscosity also improves the ease of handling and homogeneity of the reaction mixture.

Preferably, the reactant mixture comprises from about 10 to about 95 wt % PEG, typically from about 30 to about 70 wt % PEG.

According to one embodiment the reactant mixture comprises from about 10 to about 95 wt % PEG having a molecular weight of 1500 or less, typically from about 30 to about 70 wt % PEG having a molecular weight of 1500 or less.

Alternatively or additionally the reactant mixture may comprise from about 10 to about 95 wt % PEG having a molecular weight of 3000 or more typically from about 30 to about 70 wt % PEG having a molecular weight of 3000 or more.

According to one embodiment, the reactant mixture may comprise 30 to 70 wt % of a first PEG compound having a molecular weight of 1500 or less and 30 to 70 wt % of a second PEG compound having a molecular weight of 5000 or more.

The use of PEG having a molecular weight of 2000 or less, typically 1500 or less, suitably 1000 or less, may result in a polyurethane composition with a relatively low surface energy. Typically the contact angle of a lens formed from such a composition may be 40 degrees or less, generally 30 degrees or less, suitably around 25 degrees.

Di- or Poly-Isocyanate

The polymer composition of the invention is prepared using at least one di- or poly-isocyanate. Preferably, the di- or poly-isocyanate is an aliphatic di- or poly-isocyanate.

Where a poly-isocyanate is used, it has a functionality of greater than 2, generally 3, 4 or 5, advantageously 3 or 4.

Suitable poly-isocyanates for use in the compositions of the present invention include tri-functional trimer (isocyanurate) of isophorone diisocyanate, trifunctional trimer (isocyanurate) of hexamethylene diisocyanate and polymeric 4,4'-diphenylmethane diisocyanate.

More preferably, the di- or polyisocyanate is aliphatic and is free from aromatic units.

Preferably, the di- or polyisocyanate is liquid at ambient temperature.

In one preferred embodiment, the polymer composition of the invention is prepared using at least one di-isocyanate.

Preferably, the di-isocyanate is of the formula OCN—$R_1$—NCO, wherein $R_1$ is a linear or branched $C_2$-$C_{18}$-alkylene, an unsubstituted or $C_1$-$C_4$-alkyl-substituted or $C_1$-$C_4$-alkoxy-substituted $C_6$-$C_{10}$-arylene, a $C_7$-$C_{18}$-aralkylene, a $C_6$-$C_{10}$-arylene-$C_1$-$C_2$-alkylene-$C_6$-$C_{10}$-arylene, a $C_3$-$C_8$-cycloalkylene, a $C_3$-$C_8$-cycloalkylene-$C_1$-$C_6$-alkylene, a $C_3$-$C_8$-cycloalkylene-$C_1$-$C_6$-alkylene-$C_3$-$C_8$-cycloalkylene or a $C_1$-$C_6$-alkylene-$C_3$-$C_8$-cycloalkylene-$C_1$-$C_6$-alkylene.

Examples of particularly preferred di-isocyanates include methylene dicyclohexyl di-isocyanate, hexamethylene di-isocyanate, isophorone di-isocyanate, toluene-2,4di-isocyanate, toluene-2,6-di-isocyanate, mixtures of toluene-2,4 and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 4,4"-biphenylene diisocyanate, 3,3"-dichloro4,4"-biphenylene diisocyanate, 1,4-tetramethylene diisocyanate, 1,10decamethylene diisocyanate, cumene-2,4-diisocyanate, 1,5-napthalene diisocyanate, 1,4-cyclohexylene diisocyanate, 2,5-fluorenediisocyanate, polymeric 4,4'-diphenylmethane diisocyanate.

The di-isocyanate is preferably an aliphatic di-isocyanate. Aliphatic di-isocynates which are fluid at ambient temperatures are particularly preferred.

In one highly preferred embodiment, the di-isocyanate is Desmodur W (methylene bis (4-cyclohexyl isocyanate), molecular weight, MW=262.5).

Preferably, the di- or poly-isocyanate is used in an amount of from about 9 wt % to about 50 wt % of the reaction mixture, more preferably from about 20 wt % to about 35 wt %. The amount of di- or poly-isocyanate in any given composition can be adjusted to modify the relevant contact lens properties/attributes.

Polyol/Macropolyol

Where the polymer composition of the present invention is prepared using at least one di-isocyanate, the composition comprises at least one polyol or macropolyol having a functionality of more than two, or a mixture of such polyols or macropolyols having a functionality of greater than 2.

According to some embodiments of the present invention, the polyol/macropolyol may comprise tertiary hydrogen atoms (in particular, where the polyol is glycerol). The amount of polyol/macropolyol in the reactant mixture may be no more than 9 wt %. Even in embodiments where the polyol/macropolyol comprises tertiary hydrogen atoms, they are included in the reaction mixture at relatively low levels meaning that the storage stability of the resultant composition is maintained. Generally, where the polyols of the present invention comprise tertiary hydrogen atom, they have only one tertiary hydrogen atom per molecule in contrast with PPG which has one tertiary hydrogen atom per repeat unit. Depending on the molecular weight of the PPG there are several repeat units and hence several tertiary hydrogen atoms would be present along the chain of the PPG.

The hydroxyl groups of the polyol/macropolyol and the PEG compound react with the NCO groups of the di-isocyanate to form a polymer matrix. The proportion/concentration of the polyol/macropolyol used in the reactant mixture affects the resultant material properties of the polyurethane composition formed. In particular, in cases where there is enough isocyanate to react with all of the hydroxyl groups, the greater the concentration of any given polyol/macropolyol in the reactant mixture, the greater the degree of cross-linking, leading to an increased modulus of the polyurethane composition formed. The amount of polyol/macropolyol used depends on the extent of cross-link density required, and the resultant tensile properties required. The amount of polyol or macropolyol in the reactant mixture is therefore limited to 9 wt % for contact lens applications.

The number of hydroxyl groups per unit weight of low molecular weight PEG is far greater than the number of hydroxyl groups per unit weight of high molecular weight PEG. The PEG compound of the present invention may have a relatively low molecular weight. To maintain the modulus of the resultant polymer composition at appropriate levels, the amount of polyol or macropolyol added to the reactant mixture is limited to 9 wt % or less reactant mixture. If the polyol or macropolyol is added at levels greater than 9 wt % of reactant mixture, the cross-link density of the resultant composition may be too high.

The reaction mixture preferably contains no more than 9 wt % polyol or macropolyol. Generally the amount of polyol and/or macropolyol is far lower, typically 5 wt % or less, suitably 4 wt % or less, more suitably 0.1 to 2 wt % of the reaction mixture.

The polyol or macropolyol, di-isocyanate and PEG react randomly to eventually form a polymer matrix. Where a poly-isocyanate group is used rather than a di-isocyanate group, it is not essential for the reactant mixture to include a polyol or macropolyol, as the poly-isocyanate and PEG compounds will react together to eventually form a cross-linked polymer matrix. However, in some embodiments the reactant mixture may comprise a poly-isocyanate and a polyol and/or macropolyol.

According to one embodiment, the polyol has the structure of formula I:

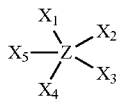

I wherein at least three of $X_1$, $X_2$, $X_3$, $X_4$ and $X_5$ independently comprise an alcohol group (generally a terminal hydroxyl group) with the remainder of $X_1$, $X_2$, $X_3$, $X_4$ and $X_5$ being independently H or absent, and Z is a central linking unit.

The polyol is a moiety comprising initiating hydroxyl groups attached to a central linking group, which is generally essentially hydrocarbon. These hydroxyl groups can each be used to polymerise a polyalkyleneoxide chain terminated by a hydroxyl group. The finally produced central linking moiety Z is generally devoid of active hydrogen atoms, that is hydrogen atoms which can initiate polymerisation. Z may contain groups that are inert to reaction to NCO groups or the alkylene oxides which are being polymerised or copolymerised. Generally the Z group has a molecular weight of 1000 or less.

According to one embodiment, Z represents a hydrocarbyl group, optionally comprising one or more ether, ester and tertiary amine groups.

Generally, at least three of $X_1$, $X_2$, $X_3$, $X_4$ and $X_5$ are each independently an OH-terminated polyoxyalkylene group, preferably OH-terminated ethylene oxide or propylene oxide groups.

The polyol of formula I is preferably a macropolyol. As used herein, the term "macropolyol" refers to a macromer bearing multiple OH functionalities.

As used herein, the term "macromer" (also referred to as "macromonomer") refers to a polymer or oligomer that has a functional group capable of participating in further polymerisation.

Generally 3, 4 or 5 of $X_1$, $X_2$, $X_3$, $X_4$ and $X_5$ represent a terminal hydroxyl group.

According to one embodiment 1 or more of $X_1$, $X_2$, $X_3$, $X_4$ and $X_5$ independently represents a hydroxyl group or an OH terminated, optionally substituted, polyoxyalkylene group. Typically 3, 4 or 5 of $X_1$, $X_2$, $X_3$, $X_4$ and $X_5$ independently represent a hydroxyl group or an OH terminated, optionally substituted, polyoxyalkylene group.

Typically the alkylene group is a 1 to 6 carbon atom alkylene group, generally 1 to 3 carbon alkylene group.

The alkylene group may be substituted with one or more ether groups. According to one embodiment the alkylene group is not substituted.

One or more of $X_1$, $X_2$, $X_3$, $X_4$ and $X_5$ may independently represent an OH-terminated polyoxyalkylene group wherein the polyoxyalkylene preferably does not comprise any tertiary hydrogen atoms. In particular, 3, 4 or 5 of X1, X2, X3, X4 and X5 may independently represent an OH-terminated polyoxyalkylene chain. Preferably, the polyoxyalkylene chains are polymers and/or co polymers of ethylene oxide, and/or propylene oxide in which the terminal hydroxyl groups may be primary or secondary hydroxyls, or a mixture thereof. More preferably, the polyoxyalkylene chains are selected from polyoxyethylene and polyoxypropylene units or a mixture thereof. However copolymers of ethylene oxide and propylene oxide can also be used. Generally such copolymers comprise terminal hydroxyl groups.

Where the polyol of formula I is derived from the polymerization of ethylene or propylene oxides, the polyol will have the same number of terminal hydroxyl groups as the number of hydroxyl groups present in the compound from which it is derived.

Generally where one or more of $X_1$, $X_2$, $X_3$, $X_4$ and $X_5$ represents an OH-terminated polyoxyalkylene chain, in particular where 3, 4 or 5 of $X_1$, $X_2$, $X_3$, $X_4$ and $X_5$ represents an OH-terminated polyoxyalkylene chain, the polyol is maintained as a liquid at ambient temperature or temperatures slightly above (20 to 40° C.). This is due to the presence of the polyoxyalkylene chains. Such a polyol provides several advantages. In particular it is easier to handle and dispense at ambient temperature.

The polyol of formula I can be derived from various multi hydroxyl compounds e.g. a polyol comprising three polyoxyalkylene chains can be derived from the polymerization of ethylene or propylene oxides above or from a starter molecule of trimethylol propane, similarly a polyol comprising four polyoxyalkylene chains can be derived from pentaerythritol, and a polyol comprising five polyoxyalkylene chains can be derived from pentanepentols and/or sugar molecules bearing at least five hydroxyl groups. These can normally be purchased from commercial suppliers.

According to one embodiment the Z group is trivalent, suitably the polyol is glycerol, trimethylpropane (TMP) or hexanetriol (HT), in particular 1, 2, 6-hexanetriol.

According to a further embodiment, the Z group is tetravalent, suitably the polyol is pentaerythritol.

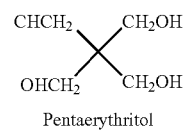

Pentaerythritol

According to a further embodiment, the Z group is pentavalent, suitably the polyol is pentanepentol (in particular 1, 2, 3, 4, 5-Pentanepentol), or is derived from pentanepentol (see formula II below).

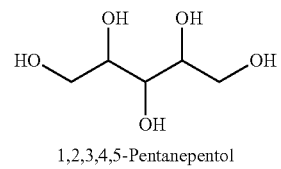

1,2,3,4,5-Pentanepentol

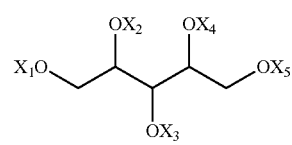

II

Where $X_1$, $X_2$, $X_3$, $X_4$ and $X_5$ independently represent H, or an optionally substituted OH terminated polyoxyalkylene chain.

In one preferred embodiment, the polyol is a macropolyol of formula Ia,

wherein each of $X_1$, $X_2$ and $X_3$ is independently a hydroxyl group or an optionally substituted OH terminated polyoxyalkylene group;
and $X_4$ is H or as defined for $X_1$, $X_2$ and $X_3$.

In one preferred embodiment, the polyol is of formula Ia, each of $X_1$, $X_2$ and $X_3$ is independently an OH-terminated, unsubstituted polyoxyalkylene chain and $X_4$ is H.

Alternatively the polyol is of formula Ia, each of $X_1$, $X_2$ and $X_3$ is independently an OH-terminated, polyoxyalkylene chain and $X_4$ is H, where the polyoxyalkylene chain does not comprise any tertiary hydrogen atoms.

In another preferred embodiment, the polyol is of formula Ia, each of $X_1$, $X_2$ and $X_3$ and $X_4$ is independently an OH-terminated unsubstituted polyoxyalkylene chain, or alternatively an OH-terminated polyoxyalkylene chain where the polyoxyalkylene chain does not comprise any tertiary hydrogen atoms.

In another preferred embodiment, the macropolyol is of formula Ib,

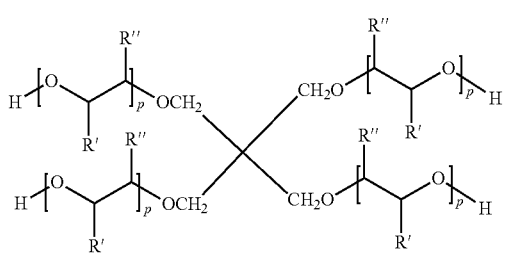

wherein each p is from about 3 to about 25 and R' and R" represent H. More preferably, p is about 25.

According to one embodiment the polyol is selected from the group consisting of Trimethylolpropane (TMP), 1,2,6-Hexanetriol (HT) and Pentaerythritol (PER).

1,2,6-Hexanetriol (HT) is a clear, colourless viscous liquid at room temperature. HT acts as a 3D crosslinking agent. Increasing the concentration of HT in the reactant mixture, increases the modulus and reduces the water content of the resultant composition. Generally where the polyol is HT, the amount of polyol is 1 wt % or less, typically 0.2 to 0.7 wt %, generally 0.3 to 0.6 wt %.

Pentaerythritol (PER) is a white solid at room temperature. PER contains four hydroxyl groups and is used as covalent crosslinker to provide mechanical and thermal stability to the three dimensional polymer matrix of the resultant composition. Increasing the concentration of PER in the reactant mixture, increases the modulus and reduces the water content of the resultant composition. Generally where the polyol is PER, the amount of polyol is 1 wt % or less, typically 0.05 to 0.2 wt %, generally 0.05 to 0.1 wt %.

Trimethylolpropane (TMP) with its three primary alcohol groups is used as a three dimensional crosslinking agent. It is a white solid at room temperature and easily melts to give a clear liquid at temperatures above its melting range of 58-60° C. Increasing the amount of TMP present in the reactant mixture, increases the modulus and reduces the water content of the resultant composition. Generally where the polyol is TMP, the amount of polyol is 5 wt % or less, typically 0.5 to 3 wt %.

Preferably, the polyol or macropolyol is a fluid at ambient temperatures.

Preferably, the macropolyol has a molecular weight of from about 500 to about 20,000, more preferably from about 500 to about 15,000.

In one highly preferred embodiment, the macropolyol is an ethylene oxide/propylene oxide copolymerisate, typically having four hydroxy groups. According to one embodiment, the macropolyol has the structure of formula Ib above.

Such ethylene oxide/propylene oxide copolymerisates are available from Clariant under reference P41, in particular P41/200, P41/300, P41/3000 and P41/12000 may be used.

In one highly preferred embodiment, the macropolyol is P41/300. Various grades of P41/300 are commercially available and can be used to afford the material of the present invention.

P41/300 has a molecular weight of ~5000, P41/3000 has a molecular weight of ~15,000, whereas P41/12000 has a molecular weight of ~20,000 (where molecular weight is provided as number average molecular weight).

Advantageously, the use of macropolyols of the invention (particularly P41/300, P41/3000 or P41/12000 and related compounds) gives rise to a liquid reaction mixture in which all the reaction components and additives are maintained in the fluid state for subsequent dispensing into moulds at the ambient temperature, thereby allowing the reaction and curing to take place. The curing step may take place with or without additional heating.

Preferably, the macropolyol is used in an amount from about 10 to about 95 wt % of the reactants, more preferably from about 30 to about 70 wt % of the reactants.

The macropolyol used in the compositions of the invention is preferably a tetrafunctional hydroxyl terminated macromolecule (e.g. of formula Ia, or Ib).

Generally where the reaction mixture comprises at least one polyol or macropolyol, a poly- or di-isocyanate may be used. Advantageously a di-isocyanate is used.

According to one embodiment, more than one polyol and/or more than one macropolyol may be used in the reactant mixture.

OH/NCO Ratio

The OH/NCO ratio affects the properties of the resultant composition. In particular, the OH/NCO ratio affects the degree of cross-linking and this affects the tensile properties of the resultant composition (in particular the modulus). An OH:NCO ratio less than 1 is associated with a higher modulus. The water content upon hydration is also affected by the OH:NCO ratio, where an OH:NCO ratio of greater than 1 would result in a polymer with a higher associated water content.

In addition, the storage stability of the polyurethane composition is affected by the cross-link density, generally a relatively low cross-link density composition is expected to afford a lower storage stability than the composition with higher cross link density.

Where the reactant mixture comprises poly-isocyanate, the overall OH:NCO ratio is preferably 1:1 or above. Where the reactant mixture comprises di-isocyanate and a polyol having a functionality of 3, the overall OH:NCO ratio is preferably 1:1 or above. Where the reactant mixture comprises di-isocyanate and a polyol having a functionality of 4 or 5, the amount of di-isocyanate added to the reactant mixture may be controlled to ensure that the resultant polymer comprises some unreacted hydroxyl groups. In such embodiments, the OH:NCO ratio will not be stoichiometric.

Modulus Modifier

In one preferred embodiment of the invention, the composition further comprises one or more additional components such as a modulus modifier, plasticizer, humectant, lubricant, process aid, viscosity reducer, compatibility enhancer and/or polymer matrix structure modifier. Preferably, the additional component is present in an amount of 0 to about 20 wt %, more preferably from about 2.5 to about 10 wt %, more preferably still, about 2 to about 5 wt % of the reactants.

Suitable modulus modifiers include components that alter the modulus property of the polyurethane and may also alter the oxygen permeability property, suitably increasing the oxygen permeability of the resultant composition. Preferred modulus modifiers include a cycloalkyl modulus modifier (for example, as described in U.S. Pat. No. 4,327,203 incorporated herein by reference) or a polycyclic modulus modifier.

The modulus modifier has to be compatible such that it remains evenly distributed (i.e. homogeneous) and does not significantly alter the transmission properties and further, is non-toxic. Moreover, the modulus modifier should not generally react with the reactive components of the composition (I.e. PEG, di- or poly-isocyanate and polyol). If required, the modulus modifier may be extracted from the polymer composition following the polymerization reaction, for instance extracted out during the processing steps of lens manufacture.

In one particularly preferred embodiment, the additional component is poly (ethylene glycol) dimethyl ether (PEG DME), which can act as a modulus modifier, plasticizer, humectant/lubricant, process aid, viscosity reducer, compatibility enhancer and polymer matrix structure modifier. PEG DMEs of various molecular weights (e.g. 250, 500, 1000, and 2000) are commercially available and are suitable for use in the present invention. Preferably, for the purposes of the present invention, the PEG DME has a molecular weight of 250 (e.g. PEG DME-250). As an alternative, polyethylene glycol dibutyl ether can also be used.

Advantageously, the incorporation of PEG DME as an additive used to form the polymer compositions of the invention leads to lenses having a reduced modulus. Preferably, the modulus of lenses prepared from the polymer compositions of the invention is from about 0.1 to about 0.8 MPa, more preferably, about 0.3 to about 0.7 MPa, advantageously 0.4 to 0.5 MPa.

The cross-linking in a composition increases the structural integrity, improves the storage stability and also increases the modulus of the material. However, high modulus compositions are not preferred for use in the manufacture of contact lenses. Therefore, in such circumstances a modulus modifier, such as PEG DME, suitably reduces the modulus of the composition. The concentration of the modulus modifier in a given composition can be adjusted to obtain the required modulus of the material, resulting in a medical device which is compatible for use in or on the body. In particular such a composition would provide a contact lens which is comfortable to wear.

The use of a modulus modifier may reduce the viscosity of the reactant mixture, and may also increase the working time associated with the reaction mixture by the small reduction of the concentration of the reactive groups. This is advantageous as it means that the reaction mixture can be dispensed in moulds more easily than when using high viscosity compositions. The gelation time of the reaction mixture is also extended thereby allowing more time to dispense. The potential water content of resultant compositions is also generally increased through the use of modulus modifiers such as PEG DME, particularly when higher molecular weight PEG is used in a given composition.

Additional Components

In one preferred embodiment, the composition further comprises one or more antioxidants. Suitable antioxidants include BHA (butylated hydroxyl anisole), BHT (butylated hydroxytoluene) and ascorbic acid etc. Preferably, the antioxidant is BHA.

Preferably, the antioxidant is used in an amount of about 0.01 to about 3.0 wt % of the reactants, more preferably from about 0.02 to about 2.0 wt %, even more preferably from about 0.05 to about 1.0 wt %.

In one preferred embodiment, the composition of the invention further comprises one or more tinting agents. By way of example, suitable tinting agents commonly used in the contact lens industry include the following: benzene sulfonic acid, 4-(4,5-dihydro-4((2-methoxy-5-methyl-4((2-(sulfooxy)ethyl)sulfonyl)phenyl)azo-3-methyl-5-oxo-1H-pyrazol-1-yl); [2-naphthalene-sulfonic acid, 7-(acetylamino)-4-hydroxyl-3-((4-((sulfo-oxyethyl)sulfonyl) phenyl)azo)-]; [5-((4,6-dichloro-1,3,5-triazin-2-yl)amino-4-hydroxy-3((1-sulfo-2-naphthalenyl)azo-2,7-naphthalene-disulfonic acid, trisodium salt]; [copper, 29H, 31H-phthalocyaninato(2-)-$N_{29},N_{30},N_{31},N_{32}$)-,sulfo((4((2-sulfooxy)ethyl)sulfonyl)-phenyl)amino) sulfonyl derivative]; and [2,7-naphthalenesulfonic acid, 4-amino-5-hydroxy-3,6-bis((4-((2-(sulfooxy)ethyl)sulfonyl) phenyl)azo)-tetrasodium salt].

Particularly preferred tinting agents for use in the present invention are phthalocyanine pigments such as phthalocyanine blue and phthalocyanine green, chromic-alumina-cobaltous oxide, chromium oxides, and various iron oxides for red, yellow, brown and black colours, chromophtal violet and chromophtal oxide green. The use of organic pigments, particularly phthalocyanine pigments, more particularly copper phthalocyanine pigments, and even more particularly copper phthalocyanine blue pigment (e.g., Colour Index Pigment Blue 15, Constitution No. 74160) is preferred. Opaquing agents such as titanium dioxide may also be incorporated. For certain applications, a mixture of colours may be employed for better simulation of natural iris appearance.

In one preferred embodiment, the tinting agent is a handling tint such as Reactive Blue 4. Preferably, the weight percentage of the tinting agent is from about 0.0001 wt % to about 0.08 wt % of the reactant mixture, more preferably, 0.0001 wt % to about 0.05 wt %. In one preferred embodiment, the tinting agent is present in an amount of from about 0.005 to 0.08 wt %. In one preferred embodiment, the weight percentage of the tint is from about 0.0001% to about 0.04%, more preferably, from about 0.0001% to about 0.03 wt % of the reactants. Optionally the tinting agent can be incorporated during the hydration stage of the contact lens process.

In one preferred embodiment, the composition of the invention further comprises one or more UV blockers or UV absorbers. A UV absorber may be, for example, a strong UV absorber that exhibits relatively high absorption values in the UV-A range of about 320-380 nanometers, but is relatively transparent above about 380 nm. Preferably, the UV blocker is a commercially available UV blocker such as AEHB (acryloxyethoxy hydroxybenzophenone; $C_{18}H_{16}O_5$).

Generally speaking, a UV absorber, if present, is provided in an amount from about 0.5 wt % to about 1.5 wt % of the reactants. Particularly preferred are compositions which include from about 0.6 wt % to about 1.0 wt % UV absorber, more preferably, about 1.0 wt % of the reactants. Optionally the UV blocker may be incorporated during the hydration stage. Optionally more than one UV absorbers may be incorporated.

Components Generally Absent from the Reactant Mixture

Generally, the amount of alkylene diols containing tertiary hydrogens in the composition is minimised. Suitably the composition comprises alkylene dials at an amount of less than 10 wt % of the reactants, more suitably less than 5 wt %; typically less than 1 wt % of the reactants. According to one embodiment, the composition does not contain alkylene diols.

The presence of tertiary hydrogen atoms in a reactant mixture can potentially lead to oxidative degradation of the resultant polyurethane composition, and result poor storage stability. It is believed that this is because the tertiary hydrogen atoms act as a potential source of chain scission. By minimising the amount of PG and PPG in the reactant mixture of the composition of the present invention, the number of tertiary hydrogen atoms in the composition is also reduced. It is believed that this will lead to reduced oxidative degradation and increased storage stability of the product. The poor storage stability of known PEG polymers is well known anecdotally and has led to the lack of commercialisation of these polymers in the manufacture of medical devices, such as contact lenses.

It is believed that if the PEG based polymer compositions are produced by free radical mechanism then the residual radicals can initiate the chain cission i.e., degradation resulting poor storage stability of the product (e.g., a contact lens). However, the present invention does not utilise free radical chemistry for synthesis and hence the above mentioned degradation does not occur in the product produced by the present invention. Thereby the storage stability of the product is expected to be increased.

Moreover, by minimising the amount of PG and PPG in the reactant mixture, the amount of tertiary hydrogen atoms is minimised accordingly. Oxidative degradation of the polyurethane composition is minimised accordingly and the storage stability of the resultant polyurethane polymer is further increased.

Typically the reactant mixture of the present invention comprises less than 9 wt % of any compound comprising tertiary hydrogen atoms, generally less than 5 wt %, and suitably less than 4 wt %.

According to one embodiment the polyol is TMP and the reactant mixture comprises less than 2 wt % of any compound comprising tertiary hydrogen atoms, generally the reactant mixture comprises substantially no compound comprising tertiary hydrogen atoms.

Alternatively the polyol may be glycerol and the reactant mixture comprises less than 5 wt % of any compound comprising tertiary hydrogen atoms, typically less than 2 wt %, suitably 0.2 to 1.3 wt %, preferably about 0.4 to 0.6 wt %.

Poly(propylene glycol) (PPG) is hydrophobic. Minimising or eliminating PPG from the reactant mixture may result in a polymer having a reduced associated contact angle. Where the polymer is used to form medical devices, the medical devices are more comfortable and users are less susceptible to infection.

Generally the contact angle of a lens formed from the composition of the present invention is less than 40 degrees, where the surfactant from lens has been extracted (as far as possible) in deionised water. This compares favourably with contact lenses currently on the market which are associated with a contact angle of 60 to 70 degrees when the surfactant was removed similarly.

Process

According to an aspect of the present invention there is provided a process for preparing a polyurethane hydrogel, said process comprising:
 i.) preparing a mixture of at least one polyethylene glycol, and either
   a.) at least one poly-isocyanate having a functionality greater than 2, or
   b.) at least one di-isocyanate and at least one polyol or macropolyol having a functionality greater than 2, wherein the polyol or macropolyol is present at an amount of 0.1 to 9 wt % of the mixture;
 ii.) allowing the mixture formed in step i) to react appropriately to form a cross-linked polyurethane xerogel; and
 iii.) hydrating the xerogel using an aqueous medium to form a hydrogel.

Preferably, the process of the present invention involves curing the reactant mixture of step i. directly to form a polyurethane xerogel without the need for the addition of water as a reactant. This is in contrast to the prior art process described in U.S. Pat. No. 6,930,196.

According to one embodiment, the reactant mixture is substantially anhydrous, i.e. without the addition of water as a reactant. The incorporation of urea groups (formed from the presence of water in the reactant mixture) increases the modulus value of the resultant polyurethane composition, which is undesirable in materials for use in the contact lens industry. Advantageously, the present invention substantially excludes water from the reactant mixture (as far as practically attainable), thereby minimising the formation of urea groups in the polymer backbone and giving rise to materials where contribution towards raising the modulus by urea groups is substantially minimised.

Suitable reactants are those described above.

In one preferred embodiment, a catalyst is added to the mixture formed in step (i). Suitable catalysts (together with guidance as to the appropriate amount) are as described above. In one highly preferred embodiment, the catalyst is dibutyl tin dilaurate (DBTDL). Optionally mixed catalysts may be used. Optionally a retarded catalyst (e.g., from those used in the manufacture of polyurethane) may also be used to further increase the dispensing time before gelation occurs.

Additional components, such as modulus modifiers, plasticizers, humectants, lubricants, process aids, viscosity reducers, tinting agents, compatibility enhancers and/or polymer matrix structure modifiers as described above, may also be present in the reaction mixture. In one preferred embodiment of the invention the reactants in step (i) are mixed and dehydrated under vacuum. Preferably, the reactants are dehydrated under vacuum at a temperature of about 95° C. for at least 90 minutes in order to reduce the moisture content well below 0.05 wt %.

In one preferred embodiment, the di- or poly-isocyanate is added to a mixture of the PEG (reactants of a composition) optionally containing the polyol for carrying out polymerization.

Preferably, the reactants in step (i) are degassed under vacuum using a rotary evaporator. The xerogel may be hydrated using an aqueous medium with or without a surfactant.

A further aspect relates to a hydrogel or xerogel obtained or obtainable by the process of the invention.

According to a further aspect of the present invention, there is provided the use of the hydrogel or xerogel formed according to the method of the present invention in the formation of an article of manufacture.

The molded article may be in the form of a medical device for use in or on the body. The medical device may be exemplified by, but by no means limited to urinary tract devices (including uretheral stents and urinary catheters), ocular devices (including contact lenses and intra-ocular lens shooter devices), intraocular lenses, orthopaedic devices, respiratory devices (including endotracheal tubes), cardiovascular devices, dental devices, neurological devices, gastrointestinal devices, audiology devices, surgical devices, including surgical gloves, foot care devices, wound healing devices, condoms and the like apheresis equipment, blood bags; blood administration tubing; extracorporeal membrane oxygenation equipment; dialysis and peritoneal drainage bags; urinary collection bags; urological catheters; wound drainage bags and tubes; enteral feeding equipment; nasogastric tubes; intravenous catheters, drip chambers, tubing and solution bags; total parenteral nutrition bags; hemodialysis tubing and catheters; film wrap; gloves; endotrachael tubes; tracheostomy tubes; oesophageal tubes; humidifiers; ocular prosthesis; or sterile water bags and tubing.

According to one embodiment the medical devices is a lens, such as a contact lens, a catheter, or an intra-ocular lens shooter device.

Yet another aspect relates to the use of a polymer according to the invention in the preparation of a contact lens.

Process for Preparing a Contact Lens

A further aspect of the present invention relates to a process for preparing a contact lens comprising the steps of:
i) preparing a mixture of at least one polyethylene glycol, and either
 a) at least one poly-isocyanate having a functionality greater than 2, or
 b) at least one di-isocyanate and at least one polyol or macropolyol having a functionality greater than 2, wherein the polyol or macropolyol is present at an amount of 0.1 to 9 wt % of the mixture;
ii) dispensing the reaction mixture formed in step i) into a contact lens mould;
iii) allowing the reaction mixture to cure;
iv) removing the contact lens from the mould; and
v) hydrating the contact lens.

In one preferred embodiment, the reactants in step (i) are dispensed into a female lens mould and the male part of the lens mould is then placed over the liquid contained in the female part and subsequently closed, typically by a machine or other means.

In one preferred embodiment, the moulds are placed in an oven and allowed to cure to complete the reaction. Preferably, the moulds are allowed to cure at a temperature of from about 70° C. to about 100° C., more preferably, from about 85° C. to about 95° C. In one highly preferred embodiment, the moulds are allowed to cure at a temperature of least 95° C.

Preferably, the moulds are allowed to cure for about 0.5 to about 24 hours, more preferably for about 15 to 22 hours. Alternatively, the moulds may be allowed to cure for about 3 to about 8 hours, typically for at least about 5 hours.

Optionally the curing can also be done in the oven under a dry nitrogen flow.

Preferably, the moulds are removed from the oven and allowed to cool to around ambient temperature, and then may be demoulded.

Optionally, after step (iii) the mould may be cooled to a temperature of from about −30° C. to about −120° C. prior to removing the contact lens from the mould.

Suitably, the moulds are chilled in a freezer. More preferably, still, the moulds are chilled to a temperature of from about −50° C. to about −90° C., even more preferably from about −60° C. to about −90° C. More preferably still, the moulds are chilled to a temperature of about −80° C. Preferably, the moulds are chilled for at least 30 minutes, more preferably, at least 60 minutes. In one especially preferred embodiment, the lenses are chilled for at least 20 minutes.

Advantageously, the cooling process allows the polymer chains to attain a temperature below the glass transition temperature that shrinks the polymer matrix and reduces the interaction at the interface which enhances the demoulding of the lens product.

The lenses are then preferably demoulded from the moulds by separating the male and female parts. Preferably, the lenses are hydrated by immersion in a hydration solution. Typically the hydration solution comprises saline solution which may optionally comprise surfactant.

According to one embodiment the hydration solution comprises a polysorbate compound.

Alternatively, in another preferred embodiment where PEG DME has been used in the formulation, the lens moulds are physically separated (at ambient temperature) and the part containing the lens is immersed in excess of saline solution (optionally comprising surfactant) for 5-150 minutes, more preferably for 60-90 minutes, more preferably still for 30-60 minutes, to demould the lens.

Generally, processing step (iii) involves reaction cast moulding the material into the shape of a lens. Generally the process of preparing a contact lens involves reaction cast moulding (RCM) the lens.

The polymeric composition of the present invention is covalently cross-linked and, once polymerised, will not melt or flow without chemical decomposition.

Method of Treating a Polyurethane Composition

According to a further aspect of the present invention there is provided a method of treating a polyurethane composition to increase its transparency, comprising the step of contacting the polyurethane composition with a polysorbate compound, in particular a polyoxyethylene sorbitan compound such as Tween®.

Generally an article formed from a polyurethane composition is contacted with a polysorbate compound.

The method of the present invention increases the transparency of polyurethane compositions by reducing, or eliminating, the amount of light scattered by the compositions, as the Tyndall effect often associated with such compositions is reduced or eliminated.

The extent of the Tyndall effect associated with a particular composition is generally assessed through visual inspection. The inspection is thus subjective. Furthermore, the extent of the Tyndall effect is dependent on the angle of light incident on the composition.

In general, the method of the present invention reduces the Tyndall effect associated with the polyurethane composition by at least 10%, typically at least 50%, suitably at least 75%. According to one embodiment, there is no Tyndall effect associated with the polyurethane composition following treatment in accordance with the method of the present invention.

The method of the present invention may reduce the contact angle associated with the polyurethane composition. The contact angle may be reduced by about 50% or more, typically 30 to 70%, suitably 40 to 60% of the initial contact angle.

The method of the present invention may also increase the water content associated with the polyurethane composition. Typically the water content is increased by at least around 10%, generally 20 to 40%. By increasing the water content of the polyurethane composition, other attributes of the polyurethane composition may be affected, including the oxygen permeability (DK), and modulus. Generally the water content of the polyurethane is increased, increasing the oxygen permeability and decreasing the modulus of the polyurethane composition. Where the polyurethane composition is used to form a medical device, such as a contact lens, the size of the medical device generally increases, in particular the diameter of a contact lens formed from a polyurethane composition treated according to the method of the present invention is generally greater than the diameter of a contact lens formed from an equivalent untreated polyurethane composition.

Generally compositions used to form medical devices are subjected to sterilisation, in particular involving exposure to temperatures of at least 100 degrees Celsius, for instance high pressure, high temperature (HPHT) procedures. Medical devices may be subjected to autoclaving involving sterilisation through exposure to high pressure saturated steam at temperatures of at least 120° C. Some articles formed from polyurethane compositions may appear to exhibit good transparency properties upon initial manufacture, Transparency can decrease upon storage, or in particular upon exposure of the article to high pressure and/or high temperature conditions such as those commonly used in sterilisation procedures.

Advantageously, the transparency properties associated with an article formed from a polyurethane composition are assessed following exposure to HPHT conditions such as those used in sterilisation procedures. In addition, the transparency properties are generally assessed following hydration of the article.

The polysorbate compound of the method of the present invention is typically selected from the group consisting of polysorbate 20 or polyoxyethylene 20 sorbitan monolaurate (also known as Tween® 20), polysorbate 40 or polyoxyethylene 40 sorbitan monopalmitate (also known as Tween® 40), polysorbate 60 or polyoxyethylene 60 sorbitan monostearate (also known as Tween® 60), polysorbate 80 or polyoxyethylene 80 sorbitan monoleate (also known as Tween® 80).

The polyurethane composition to be treated is typically in the form of a medical device for use in or on the body. The medical device may be exemplified by, but by no means limited to, urinary tract devices (including ureteral stents and urinary catheters), ocular devices (including contact lenses and intra-ocular shooters), intraocular lenses, orthopaedic devices, respiratory devices (including endotracheal tubes), cardiovascular devices, dental devices, neurological devices, gastrointestinal devices, audiology devices, surgical devices, including surgical gloves, foot care devices, wound healing devices, condoms and the like apheresis equipment, blood bags; blood administration tubing; extracorporeal membrane oxygenation equipment; dialysis and peritoneal drainage bags; urinary collection bags; urological catheters; wound drainage bags and tubes; enteral feeding equipment; nasogastric tubes; intravenous catheters, drip chambers, tubing and solution bags; total parenteral nutrition bags; haemodialysis tubing and catheters; film wrap; gloves; endotracheal tubes; tracheostomy tubes; oesophageal tubes; humidifiers; ocular prosthesis; or sterile water bags and tubing.

According to one embodiment the medical device is a lens, such as a contact lens, a catheter, or an intra-ocular lens shooter.

According to one embodiment, the polyurethane composition to be treated is that formed from the PEG mixture described above.

Whilst the applicant does not wish to be bound by any theory, it is believed that where a polyurethane composition has been manufactured using a relatively shorter chain length monomers, in such cases the urethane blocks generated by the reaction of the NCO and OH functional groups can cluster together thereby increasing the risk of phase separation. An article formed from the polyurethane composition will generally be exposed to elevated temperature and/or elevated pressure as part of the sterilisation process. It is believed that such conditions remove substantial amount of water from the polyurethane composition by the process called syneresis, forcing the polyurethane chains more closer together, thus increasing the risk of phase separation. Such phase separation persists even on subsequent hydration on cooling to ambient temperature, and reduces the transparency of the article, for instance due to inducing light scattering. Subjecting articles formed from the polyurethane composition to elevated temperature conditions and/or elevated pressure increases the risk of the formation of domains which contribute to light scattering. The light scattering may be observed only after sterilisation, typically only after hydration of the article formed from the polyurethane composition.

Surprisingly, when an article produced from a polyurethane composition is treated with a polysorbate compound prior to sterilisation light scattering is eliminated or substantially reduced, for instance due to the Tyndall effect that would otherwise appear if the said article is not treated with a polysorbate compound. This reduction or elimination of light scattering is maintained following sterilisation, including exposure of the composition to increased temperature and/or increased pressure (i.e, during a second subsequent sterilisation cycle), and following hydration of the polyurethane composition on cooling to ambient temperature. It is believed that the polysorbate compound may prevent the growth of phase separation in the polyurethane composition that results when exposed to elevated temperature and/or elevated pressure as part of a sterilisation procedure. This may mean that the extent of light scattering is reduced or eliminated.

Generally the polyurethane composition is treated according to the method of the present invention prior to exposure to elevated temperature and/or elevated pressure, for instance as part of a sterilisation procedure.

Generally the polyurethane composition is treated according to the method of the present invention after an article has been formed from the polyurethane composition. The polyurethane composition may be formed via a polymerisation reaction, and is then treated with a polysorbate compound in accordance with the method of the present invention after the polyurethane composition has cooled to below its melting temperature. Generally the polyurethane composition is treated after the composition has cooled to around ambient temperature (20 to 30° C.), and solidified. Typically, the polyurethane is treated for at least 0 to 4 hours after the polymerisation reaction has been completed.

According to one embodiment, the article (e.g., a contact lens) is immersed in a hydration solution comprising the polysorbate compound. The hydration solution containing the article is then autoclaved to effect sterilisation. The polyurethane article may remain in contact with the polysorbate compound for 0.5 to 4 hours prior to being subjected to a steam sterilisation cycle.

Typically the hydration solution comprises saline, one or more polysorbate detergents and/or one or more excipients or adjuvants such as surfactant compounds.

The hydration solution generally comprises the polysorbate compound at a concentration of 0.1 to 1.0 wt % polysorbate compound, typically 0.2 to 0.4 wt. %, suitably 0.3 to 0.35 wt. %. It is believed that polysorbate may partially remain associated with the lens matrix thereby affording a lower surface energy which is evidenced in a lower contact angle. This would improve water binding properties and would potentially offer a better on-eye comfort.

Article of Manufacture

Another aspect of the invention relates to an article of manufacture comprising a polymer as described above.

Preferably, the article of manufacture is in the form of a contact lens.

A contact lens must be permeable to oxygen in order for the lens to facilitate normal corneal metabolism. Preferably, contact lenses prepared using the polymer composition of the invention exhibit a DK value of a least 10 Barrer more preferably, at least 20, even more preferably, about 30 Barrer.

In one preferred embodiment, the lenses have a OK of about 15 to about 35 Barrer, more preferably, from about 25 to about 35 or more Barrer.

A contact lens must be able to transmit light in the visible region in order to function effectively in correcting visual defects. Preferably, contact lenses prepared using the polymer composition of the invention exhibit a light transmissibility of at least 80%, more preferably, at least 90%, and even more preferably, at least 95% or 97%. Preferably, the light transmissibility is from about 90 to about 100%, more preferably from about 95 to about 100%, more preferably still, 100%.

Preferably, contact lenses prepared using the polymer composition of the invention exhibit a modulus of from about 0.1 to about 1.25 MPa, typically from about 0.25 to about 0.75 MPa, generally from about 0.30 to about 0.5 MPa.

The modulus of a contact lens plays a key role in controlling the mechanical properties of a soft contact lens. In addition, the on-eye performance is directly affected by the modulus. A value of greater than 1.25 MPa is likely to cause corneal staining whilst a modulus below 0.1 MPa is likely to lead to a lens with poor handling properties.

Preferably, contact lenses prepared using the polymer composition of the invention have a water content of 10 to about 90 weight %, more preferably, from about 20 to about 80 weight %, more preferably, from about 25 to about 75 weight %, even more preferably, from about 30 to about 70 weight %, more preferably still, from about 40 to about 70 weight %.

The equilibrium water content of the lens is a function of the material properties and plays a key role in determining the bulk mechanical and physical properties of the lens. Water and the polyethylene oxide chains provide the medium to transmit oxygen and with the modulus governs the on-eye properties of the lens.

Generally the polyurethane composition of the present invention has a very high visual clarity, with little or no associated light scattering. Lenses formed from the polyurethane composition of the present invention do not generally exhibit any Tyndall effect, in particular if the lenses have been contacted with a polysorbate compound in accordance with the method of the present invention.

The present invention will now be described by way of non-limiting example only with reference to accompanying Tables 1, 2 and 3 illustrating embodiments of the present invention.

Examples

The required quantities of the reactants and additives described in Table 1, 2 and 3 were accurately weighed into a round bottom Quickfit flask using a 4-place balance and stoppered. The contents after mixing were dehydrated under vacuum at 95° C. for at least 90 minutes using a Buchi rotary evaporator. The addition of Desmodur W in particular is excluded at this stage. This is added at a later stage of the process as described below.

The flask was lifted out of the oil bath and allowed to cool down to ambient temperature. Once cooled, the required amount of the catalyst (DBTDL) was added through a needled syringe (by the difference of weight of the syringe containing DBTDL before and after the addition to the flask containing the dehydrated components). The flask was quickly stoppered and shaken. Finally the appropriate quantity of Desmodur W was added into the flask (by the weight difference of a syringe containing the required amount of the Desmodur W) in a fume hood. Optionally the order of mixing the catalyst and Desmodur W can also be reversed for convenience of better mixing and subsequent dispensing into the molds. The contents of the flask were mixed vigorously (ensuring the flask remains stoppered) and quickly degassed under vacuum for ~1 minute using a rotary evaporator (without using oil bath) to eliminate/reduce the bubbles. The mixture was then dispensed into female polypropylene lens molds (25-55 microliter per lens as appropriate for a given mold variety). The male part of the lens mold was then placed carefully over the liquid contained in the female part and subsequently closed using a machine appropriately preset for the mold type used. This operation was repeated until all the lens molds were closed. The moulds were stacked in a row and a weight was placed on the molds to compress the male and female parts of the moulds. While being compressed, optionally, each mould assembly was heat sealed using a hot welding probe. These molds were then placed in a tray, put in an oven set at 95° C. and allowed to cure for 5 to 24 hours to complete the reaction. Optionally, the curing can be done under dry nitrogen. The molds were then removed from the oven, and allowed to cool to ambient temperature. The lenses were demolded from the molds by separating the male and female parts and subsequently immersing in a hydration solution contained in glass vials. The hydration solution comprised saline and 0.35 wt % polysorbate detergent Tween®20. The vials containing the lenses were stored at ambient temperature for around 0.5 to 4 hours. These vials containing lenses were then subjected to a steam sterilization cycle using an autoclave and standard method.

Water Content

Water content is calculated after measurement of dry weight and hydrated weight of a lens by using the following equation:

$$\text{Water Content (\%)} = (W_{hydrated\ lens} - W_{dry\ lens}) / W_{hydrated\ lens} [\times 100]$$

Five hydrated lenses, with excess surface water removed, are separately weighed on an analytical balance. The lenses are then dried in an oven at 75° C. for 2 hours and weighed again separately. The water content of each lens was determined separately using the above equation. Finally an average value for the water content of the lenses was determined, and the average value represents the water content of that lens composition.

% Transmittance

% Transmittance was determined under the guidance of ISO 18369 by using a double beam UV spectrophotometer (Jasco V530). A lens is placed into a cuvette containing standard saline solution. The cuvette is placed in the sample compartment. A matching cuvette containing saline is placed in the reference compartment of the UV spectrophotometer and a spectrum as percent transmittance was recorded between 200-780 nm. The test was repeated a further four times and the mean value (% transmittance) at 550 nm was recorded. The lenses of the present invention afforded light transmission in excess of 80% at 550 nm.

DK Measurement

DK Measurement (i.e., oxygen permeability) was carried out by the polarographic technique as briefly described below:

Ten lenses were placed into the Gallenkamp incubator set at 35+/−0.5° C. for 24 hours. The centre thickness (CT) of each of the ten lenses were measured by Rehder ET-3 Electronic Thickness Gauge and these lenses were stacked as follows: A single lens stack, two lens stack, three lens stack, and four lens stack. The CT of each stack was measured three times and a mean value for each was calculated and fed into a spread sheet specifically developed for the method. Also recorded was the atmospheric pressure. The stack of lenses were replaced into the incubator set at 35+/−0.5° C. and humidity >98%.

Each stack was separately placed on to the electrode (Rehder Perineometer with 8.7 mm electrode) ensuring that there are no bubbles entrapped between the lenses and the electrode. When the current reached its lowest point the reading was recorded in the relevant section of the spread sheet. This test was repeated for all the stacks.

The dark current reading (background) of the measurement system, when no oxygen is able to pass through to the electrode, was recorded and subtracted from all test material current values. Data was analysed taking into consideration the partial pressure of oxygen and the surface area of the polarographic sensor used and finally corrected for the edge effect. A graph of DK/t corr verses thickness (cm) was then plotted and the inverse of the gradient of the best fit taken to represent the permeability (DK) of the lens material.

Modulus Data

Modulus data was measured for contact lenses prepared in accordance with the invention by tensile testing using the Instron 5842 Tensile testing system with Merlin Software.

Contact Angle

The contact lenses to be tested were prepared by extracting them from the surfactant solution in which they are generally stored. Each lens was removed from packaging and dried using tissue. Six lenses of each lens type were placed into a jar containing at least 500 mls of deionised water (DI water). Each jar was then stored at 25° C. for 16 hours or more. The DI water was then replaced and each jar was placed onto a roller unit for 2 hours. The lenses were then taken out of the jars and placed separately into labelled vials containing fresh DI water.

The wet lenses were removed from the jar using silicone tipped tweezers. Excess saline was removed by placing the lens front surface down onto a lint free tissue. The lens was then placed so that the convex surface was facing upwards, and a test sample was cut using the 4 mm cutter. The cut lens section was then placed face down on the lens wipe and the surface liquid was allowed to blot. The section was placed onto a microscope slide with front of the lens facing upwards and the section lying flat. The microscope slide was then placed underneath the PGX within the camera zone. "Pump" was pressed on the PGX, until a droplet emerges, this droplet then falls onto the section surface of the cut lens strip. The software measures the contact angle as soon as the drop touches the surface.

Process (Material Preparation)

Thickness readings for each lens were obtained using the ET-3 Thickness gauge. The len was placed flat on the cutting mat and two long pieces were cut from around the centre of the flat lens using a razor blade. These cut pieces were put into saline solution in a sample dish. The sample was loaded on to clamps using tweezers carefully going for the top clamp first and then the bottom. The gap in between the clamps was set at 10 mm using a calibrated vernier caliper. Once set, the "Reset GL" button was pressed to set the Gauge Length". Once the sample was loaded, the balance load was set to 0.000N and the test was started using the console controls.

Table 1 shows some examples of the compositions of the present invention where the reactive mixture was dispensed at room temperature into preferably pre-heated polypropylene molds. The compositions of Table 1 contained the polyol glycerol.

Table 2 shows some examples of the compositions of the present invention where the reactive mixture was dispensed at room temperature into preferably pre-heated polypropylene molds. The compositions of Table 2 contained the polyol TMP.

Table 3 shows some examples of the compositions of the present invention where the reactive mixture was dispensed at around 40° C. into preferably pre-heated polypropylene molds. The compositions of Table 3 contained the polyol glycerol, TMP or HT.

The compositions exemplified and summarized in Tables 1, 2 and 3 clearly indicate the use of various molecular weights of PEG from 200 to 5931. The examples also illustrate how the different components of the composition of the present invention affect the properties of the resultant lens, in particular properties such as Modulus, water content and oxygen permeability.

Table 4 shows the contact angle associated with three contact lenses formed from the composition of the present invention (V6A 75, V5D_13 and V5A36), two lenses formed from a comparative polyurethane composition comprising more than 10 wt % PPG (V2 and V3), five HEMA tenses currently on the market (1 Day Acuvue®, Clariti®, Acuvue Oasys®, Pure Vision® and Proclear 1 Day®) and low angle control film for comparative purposes.

Table 4 illustrates the surprisingly low contact angle associated with lenses formed from the composition of the present invention compared with lenses formed from polyurethane containing PPG or HEMA compositions.

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following claims.

TABLE 1

Examples of Compositions of the Present Invention wherein the Tri-functional Monomer is Glycerol

| Composition | PEG 600 (g) | PEG 1000 (g) | Glycerol (g) | Desmodur W (g) | BHA (g) | DBTDL (g) | PEG dme 250 (g) | EWC (%) | Modulus (MPa) | DK (Barrer) | Ocutec Ref. |
|---|---|---|---|---|---|---|---|---|---|---|---|
| 1 | | 10.0089 | 0.1847 | 3.585 | 0.1378 | 0.0177 | 0.2790 | 57.24 | 1.60 | | V6A-25 |
| Wt % = | | 70.42 | 1.30 | 25.22 | 0.97 | 0.12 | 1.96 | | | | |
| Moles × $10^{-3}$ | | 10.00 | 2.00 | 13.65 | | | | | | | |
| 2 | | 10.0177 | 0.0737 | 3.035 | 0.1310 | 0.0149 | 0.2686 | 75.61 | 0.25 | | V6A-26 |
| Wt % = | | 73.98 | 0.54 | 22.41 | 0.97 | 0.11 | 1.98 | | | | |
| Moles × $10^{-3}$ | | 10.17 | 0.80 | 11.56 | | | | | | | |
| 3 | | 10.0365 | 0.0559 | 2.991 | 0.1354 | 0.0154 | 0.2752 | 72.92 | 0.17 | | V6A-27 |
| Wt % = | | 74.29 | 0.41 | 22.14 | 1.02 | 0.11 | 2.04 | | | | |
| Moles × $10^{-3}$ | | 10.03 | 0.61 | 11.39 | | | | | | | |
| 4 | | 8.0089 | 0.0558 | 2.443 | 0.1042 | 0.0146 | 0.2260 | | 0.47 | | V6A-28 |
| Wt % = | | 73.79 | 0.51 | 22.51 | 0.96 | 0.13 | 2.08 | | | | |
| Moles × $10^{-3}$ | | 8.00 | 0.60 | 9.31 | | | | | | | |
| 5 | 5.0215 | 4.9957 | 0.0741 | 4.043 | 0.1405 | 0.0185 | 0.2873 | 63.47 | 0.64 | | V6A-30 |
| Wt % = | 34.44 | 34.26 | 0.51 | 27.73 | 0.96 | 0.12 | 1.97 | | | | |
| Moles × $10^{-3}$ | 8.37 | 4.99 | 0.80 | 15.4 | | | | | | | |
| 6 | 5.0000 | 4.9951 | 0.0662 | 3.980 | 0.1407 | 0.0154 | 0.2896 | 65.78 | 0.38 | | V6A-31 |
| Wt % = | 34.51 | 34.48 | 0.46 | 27.47 | 0.97 | 0.10 | 1.99 | | | | |
| Moles × $10^{-3}$ | 8.33 | 4.99 | 0.72 | 15.16 | | | | | | | |
| 7 | 2.0167 | 6.6661 | 0.0786 | 3.113 | 0.1290 | 0.0152 | 0 | 56.7 | 1.04 | | V6A-33 |
| Wt % = | 16.78 | 55.46 | 0.65 | 25.90 | 1.07 | 0.126 | | | | | |
| Moles × $10^{-3}$ | 3.36 | 6.66 | 0.85 | 11.86 | | | | | | | |
| 8 | 3.0247 | 6.5146 | 0.0593 | 3.464 | 0.1294 | 0.0319 | 0.2585 | 62.85 | 0.53 | 29.77 | V6A-37 |
| Wt % = | 22.43 | 48.32 | 0.44 | 25.69 | 0.96 | 0.23 | 1.92 | | | | |
| Moles × $10^{-3}$ | 5.04 | 6.51 | 0.64 | 13.1 | | | | | | | |
| 9 | 5.0075 | 5.0122 | 0.0693 | 3.983 | 0.1408 | 0.0157 | 0.2827 | 57.54 | 0.54 | 27.64 | V6A-39 |
| Wt % = | 34.50 | 34.54 | 0.48 | 27.44 | 0.97 | 0.11 | 1.95 | | | | |
| Moles × $10^{-3}$ | 8.34 | 5.01 | 0.75 | | | | | | | | |

TABLE 2

Examples of the Composition of the Present Invention wherein the Tri-functional monomer is TMP

| Composition | PEG 800 (g) | PEG600 (g) | TMP (g) | Desmodur W (g) | BHA (g) | DBTDL (g) | PEG dme 250 (g) | EWC (%) | Modulus (MPa) | DK (Barrer) | Ocutec Ref. |
|---|---|---|---|---|---|---|---|---|---|---|---|
| 1 | 9.0117 | | 0.1069 | 3.441 | 0.1250 | 0.0152 | 0.2568 | 58.43 | 0.43 | 30.52 | V6A-12 |
| Wt % = | 69.55 | | 0.82 | 26.56 | 0.96 | 0.12 | 1.99 | | | | |
| Moles × $10^{-3}$ | 11.26 | | 0.79 | 13.10 | | | | | | | |
| 2 | | 8.9990 | 0.1205 | 4.537 | 0.1363 | 0.0172 | 0.2758 | 46.25 | 0.97 | 13.5 | V6A-14 |
| Wt % = | | 63.88 | 0.85 | 32.20 | 0.97 | 0.12 | 1.96 | | | | |
| Moles × $10^{-3}$ | | 14.99 | 0.89 | 17.28 | | | | | | | |
| 3 | 9.5459 | | 0.1038 | 3.606 | | | | 62.5 | 0.37 | | V6A-15 |
| Wt % = | 69.64 | | 0.76 | 26.31 | | | | | | | |
| Moles × $10^{-3}$ | 11.93 | | 0.77 | 13.73 | | | | | | | |
| 4 | 9.5110 | | 0.0948 | 3.580 | 0.1330 | 0.0251 | 0.2715 | 65.17 | 0.17 | | V6A-16 |
| Wt % = | 69.85 | | 0.69 | 26.29 | 0.98 | 0.18 | 1.99 | | | | |
| Moles × $10^{-3}$ | 11.89 | | 0.71 | 13.6 | | | | | | | |
| 5 | 9.1998 | | 0.1002 | 3.489 | 0.1275 | 0.0150 | 0.2575 | ~65.0 | 0.17 | | V6A-32 |
| Wt % = | 69.75 | | 0.76 | 26.45 | 0.97 | 0.11 | 1.95 | | | | |
| Moles × $10^{-3}$ | 11.49 | | 0.75 | 13.29 | | | | | | | |
| 6 | 9.2248 | | 0.1153 | 3.519 | 0.1285 | 0.0162 | 0.2568 | 56.6 | 0.75 | | V6A-34 |
| Wt % = | 70.11 | | 0.87 | 26.75 | 0.98 | 0.12 | 1.95 | | | | |
| Moles × $10^{-3}$ | 11.53 | | 0.86 | 13.4 | | | | | | | |
| 7 | 9.2130 | | 0.1045 | 3.504 | 0.1276 | 0.0149 | 0.2588 | 58.6 | 0.53 | 26.15 | V6A-36 |
| Wt % = | 69.57 | | 0.79 | 26.50 | 0.96 | 0.11 | 1.96 | | | | |
| Moles × $10^{-3}$ | 11.5 | | 0.78 | 13.34 | | | | | | | |

TABLE 2-continued

Examples of the Composition of the Present Invention wherein the Tri-functional monomer is TMP

| Composition | PEG 800 (g) | PEG600 (g) | TMP (g) | Desmodur W (g) | BHA (g) | DBTDL (g) | PEG dme 250 (g) | EWC (%) | Modulus (MPa) | DK (Barrer) | Ocutec Ref. |
|---|---|---|---|---|---|---|---|---|---|---|---|
| 8 | 9.2115 | | 0.1020 | 3.498 | 0.1272 | 0.0170 | 0.2912 | 58.5 | 0.50 | 27.10 | V6A-40 |
| Wt % = | 69.53 | | 0.77 | 26.41 | 0.96 | 0.13 | 2.19 | | | | |
| Moles × 10⁻³ | 11.51 | | 0.76 | 13.32 | | | | | | | |

PEG = Ploy(ethylene glycol) the number 800 Or 600 refers to its number average molecular weight, TMP = Trimethalol propane, BHA = Butylated hydroxy anisole, DBTDL = Dibutyl tin dilaurate, PEGdme = Ploy(ethylene glycol)dimethyl ether terminated the number 250 refers to its molecular weight., EWC = equilibrium water content, OK = Oxygen permeability

TABLE 3

Compositions of the Present Invention comprising HMW and LMW PEG

| Composition | PEG 200 (g) | PEG 600 (g) | PEG 800 | PEG 1000 | PEG 1500 | PEG 3350 (g) | PEG 5931 | TMP (g) | HT (g) | Glycerol (g) |
|---|---|---|---|---|---|---|---|---|---|---|
| 1 | | 10.751 | | | | 5.000 | | 0.2995 | | |
| Wt % = | | 46.67 | | | | 21.70 | | 1.30 | | |
| Moles × 10⁻³ | | 17.92 | | | | 1.49 | | 2.23 | | |
| 2 | | 10.7490 | | | | 5.002 | | 0.1995 | | |
| Wt % = | | 47.50 | | | | 22.10 | | 0.88 | | |
| Moles × 10⁻³ | | 17.91 | | | | 1.49 | | 1.48 | | |
| 3 | | 10.743 | | | | 5.000 | | 0.2202 | | |
| Wt % = | | 47.38 | | | | 22.05 | | 0.97 | | |
| Moles × 10⁻³ | | 17.90 | | | | 1.49 | | 1.64 | | |
| 4 | | | 14.325 | | | 5.025 | | 0.3011 | | |
| Wt % = | | | 51.95 | | | 18.22 | | 1.09 | | |
| Moles × 10⁻³ | | | 17.90 | | | 1.50 | | 2.24 | | |
| 5 | | 10.750 | | | | 2.503 | | 0.1517 | | |
| Wt % = | | 53.22 | | | | 12.39 | | 0.75 | | |
| Moles × 10⁻³ | | 17.91 | | | | 0.75 | | 1.13 | | |
| 6 | | 10.844 | | | | 2.500 | | 0.1510 | | |
| Wt % = | | 53.62 | | | | 12.32 | | 0.74 | | |
| Moles × 10⁻³ | | 18.14 | | | | 0.74 | | 1.12 | | |
| 7 | | | | | 12.538 | 2.006 | | | | 0.2194 |
| Wt % = | | | | | 64.88 | 10.38 | | | | 1.13 |
| Moles × 10⁻³ | | | | | | | | | | |
| 8 | | 10.746 | | | | 5.000 | | | | 0.1585 |
| Wt % = | | 46.08 | | | | 21.47 | | | | 0.68 |
| Moles × 10⁻³ | | 17.91 | | | | 1.49 | | | | 1.72 |
| 9 | 9.562 | | | | | 11.999 | | 0.1689 | | |
| Wt % = | 25.00 | | | | | 31.38 | | 0.44 | | |
| Moles × 10⁻³ | 47.81 | | | | | 3.58 | | 1.258 | | |
| 10 | | | | 10.7491 | | 3.0060 | | 0.2405 | | |
| Wt % = | | | | 59.49 | | 16.64 | | 1.33 | | |
| Moles × 10⁻³ | | | | 10.74 | | 0.897 | | 1.79 | | |
| 11 | | | | 20.000 | | | | 0.4030 | | |
| Wt % = | | | | 72.84 | | | | 1.467 | | |
| Moles × 10⁻³ | | | | 20.00 | | | | 3.00 | | |
| 12 | | 10.139 | | | | | 2.0063 | 0.1139 | | |
| Wt % = | | 56.87 | | | | | 11.25 | 0.638 | | |
| Moles × 10⁻³ | | 16.89 | | | | | 0.338 | 0.849 | | |

| Composition | Desmodur W (g) | BHA (g) | Reactive Blue 4 (g) | DBTDL (g) | PEG dme 250 (g) | Modulus (MPa) | EWC (%) | DK (Barrer) | Ocutec Ref |
|---|---|---|---|---|---|---|---|---|---|
| 1 | 6.262 | 0.2248 | 0.0069 | 0.0300 | 0.4596 | 1.25 | 58.1 | 38.69 | V5A-8 |
| Wt % = | 27.186 | 0.97 | 0.03 | 0.13 | 1.99 | | | | |
| Moles × 10⁻³ | 23.85 | | | | | | | | |
| 2 | 5.982 | 0.2198 | 0.0057 | 0.0250 | 0.4460 | 0.71 | 60.3 | 36.14 | V5A-9 |
| Wt % = | 26.43 | 0.97 | 0.025 | 0.11 | 1.97 | | | | |
| Moles × 10⁻³ | 22.78 | | | | | | | | |

TABLE 3-continued

Compositions of the Present Invention comprising HMW and LMW PEG

| 3 | 6.018 | 0.2198 | 0.0069 | 0.0216 | 0.4452 | 0.75 | 63.7 | | V5A-10 |
|---|---|---|---|---|---|---|---|---|---|
| Wt % = | 26.54 | 0.97 | 0.03 | 0.09 | 1.96 | | | | |
| Moles × $10^{-3}$ | 22.92 | | | | | | | | |
| 4 | 6.317 | 0.2587 | 0.0086 | 0.0251 | 1.3157 | | | 33.51 | V5A-14 |
| Wt % = | 22.90 | 0.94 | 0.03 | 0.09 | 4.77 | | | | |
| Moles × $10^{-3}$ | 24.06 | | | | | | | | |
| 5 | 5.6050 | 0.1905 | | 0.0197 | 0.9794 | 0.34 | | | V5A-27 |
| Wt % = | 27.75 | 0.94 | | 0.09 | 4.85 | | | | |
| Moles × $10^{-3}$ | 21.35 | | | | | | | | |
| 6 | 5.586 | 0.1906 | 0.0059 | 0.0203 | 0.9585 | | 63.4 | | V5A-26 |
| Wt % = | 27.52 | 0.94 | 0.029 | 0.10 | 4.72 | | | | |
| Moles × $10^{-3}$ | 21.28 | | | | | | | | |
| 7 | 3.442 | 0.1815 | 0.0056 | 0.0184 | 0.9122 | 1.13 | 71.7 | 26.36 | V5A-23 |
| Wt % = | 17.81 | 0.94 | 0.029 | 0.095 | 4.72 | | | | |
| Moles × $10^{-3}$ | | | | | | | | | |
| 8 | 6.041 | 0.2190 | 0.0069 | 0.0232 | 1.1156 | 0.23 | 62.7 | 29.2 | V5A-24 |
| Wt % = | 25.91 | 0.94 | 0.03 | 1.00 | 4.78 | | | | |
| Moles × $10^{-3}$ | 23.0 | | | | | | | | |
| 9 | 14.240 | 0.3614 | 0.0109 | 0.0387 | 1.8565 | | 55.77 | | V5A-6 |
| Wt % = | 37.24 | 0.94 | 0.03 | 0.10 | 4.85 | | | | |
| Moles × $10^{-3}$ | 54.24 | | | | | | | | |
| 10 | 3.865 | 0.1810 | 0.0059 | 0.0196 | | 1.06 | | 37.5 | V5A-17 |
| Wt % = | 21.39 | 1.00 | 0.03 | 0.11 | | | | | |
| Moles × $10^{-3}$ | 14.72 | | | | | | | | |
| 11 | 6.746 | 0.2732 | 0.0081 | 0.0281 | | 1.74 | | | V5A-18 |
| Wt % = | 24.568 | 0.99 | 0.03 | 0.10 | | | | | |
| Moles × $10^{-3}$ | 25.69 | | | | | | | | |
| 12 | 5.012 | 0.1799 | 0.0058 | 0.0210 | 0.3482 | 0.44 | 60.2 | 46.22 | V5A-36 |
| Wt % = | 28.11 | 1.00 | 0.03 | 0.11 | 1.95 | | | | |
| Moles × $10^{-3}$ | 19.09 | | | | | | | | |

TABLE 4

Example illustrating contact angles

| All in DI water | 1 | 2 | 3 | 4 | 5 | 6 | Max | Min | Mean | Mean (with Max Min Removed) | SD (With Max Min Removed) |
|---|---|---|---|---|---|---|---|---|---|---|---|
| 1 Day Acuvue | 66.6 | 83.1 | 88.9 | 81.8 | 77.7 | n/a | 88.9 | 66.6 | 79.62 | 80.87 | 2.82 |
| V6A 75 | 20.5 | 14.8 | 28.1 | 19 | 17.1 | 19.4 | 28.1 | 14.8 | 19.82 | 19 | 1.42 |
| Clariti | 79.8 | 74.5 | 73.2 | 78.6 | 74 | 67 | 79.8 | 67 | 74.52 | 75.08 | 2.41 |
| Acuvue Oasys | 77.1 | 80.3 | 75.4 | 82.2 | 87.5 | 82.9 | 87.5 | 75.4 | 80.5 | 80.625 | 2.59 |
| Pure Vision | 49.9 | 64.7 | 72.4 | 78.5 | 63.1 | 51.2 | 78.5 | 49.9 | 63.3 | 62.85 | 8.76 |
| V5D_13 | 69.7 | 75.4 | 59.6 | 64.2 | 67.8 | 67 | 75.4 | 59.6 | 67.28 | 67.2 | 2.28 |
| Proclear 1 day | 78.6 | 74.1 | 80.5 | 82 | 79.6 | 86.9 | 86.9 | 74.1 | 78.96 | 80.18 | 1.21 |
| V5A36 | 12.9 | 12.5 | 20.3 | 35.5 | 31.5 | 44.1 | 44.1 | 12.5 | 26.13 | 25.05 | 10.34 |
| V3 | 69.9 | 72.8 | 68.5 | 65.1 | 72.2 | 69.5 | 72.8 | 65.1 | 69.7 | 70.03 | 1.84 |
| V2 | 68.8 | 67.9 | 67.5 | 72.9 | 68.2 | 67.2 | 72.9 | 67.2 | 69.06 | 68.1 | 0.55 |
| Low angle control film | 6.6 | 6.7 | 5.6 | 6.8 | 8.6 | 5.2 | 8.6 | 5.2 | 6.86 | 6.425 | 0.56 |
| | | | | | | | | | | Mean S.Ds | 3.16 |

The invention claimed is:

1. A contact lens formed from a polyurethane polymer composition prepared by reacting a mixture comprising:
    (a) 10 to 70 wt % of at least one polyethylene glycol having a number average molecular weight of 1000 or less and 10 to 70 wt % of at least one polyethylene glycol having a number average molecular weight of 3000 to 8000;
    (b) 9 to 50 wt % of at least one di-isocyanate; and
    (c) at least one polyol or at least one macropolyol having a functionality greater than 2, wherein the polyol or macropolyol is present at an amount of 0.1 to 5 wt % of the mixture.

2. The contact lens as claimed in claim 1 wherein the mixture contains 5 wt % or less compounds comprising tertiary hydrogen atoms.

3. The contact lens as claimed in claim 1, wherein the at least one di-isocyanate is selected from the group consisting of methylene dicyclohexyl diisocyanate, hexamethylene diisocyanate, isophorone diisocyanate, toluene-2,4-diisocyanate, toluene-2,6-diisocyanate, mixtures of toluene-2,4 and 2,6-diisocyanates, ethylene diisocyanate, propylene-1,2-diisocyanate, cyclohexylene-1,2-diisocyanate, cyclohexylene-1,4-diisocyanate, m-phenylene diisocyanate, 4,4"-biphenylene diisocyanate, 3,3"-dichloro4,4"-biphenylene diisocyanate, 1,6-hexamethylene diisocyanate, 1,4-tetramethylene diisocyanate, 1,10decamethylene diisocyanate, cumene-2,4-diisocyanate, 1,5-napthalene diisocyanate, 1,4-cyclohexylene diisocyanate, 2,5-fluorenediisocyanate, polymeric 4,4'diphenylmethane diisocyanate and mixtures thereof.

4. The contact lens as claimed in claim 1 wherein the polyol or macropolyol has the structure of formula I:

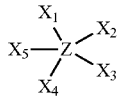
I wherein at least three of $X_1$, $X_2$, $X_3$, $X_4$ and $X_5$ are each independently an alcohol group, the remainder of $X_1$, $X_2$, $X_3$, $X_4$ and $X_5$ are each independently H or absent, and Z is a central linking unit.

5. The contact lens as claimed in claim 4 wherein Z represents a hydrocarbyl group, optionally comprising one or more ether, ester and tertiary amine groups.

6. The contact lens as claimed in claim 4 wherein Z has a number average molecular weight of 1000 or less.

7. The contact lens as claimed in claim 1 wherein the polyol is glycerol, trimethylpropane (TMP) or hexanetriol (HT).

8. The contact lens as claimed in claim 1 wherein the macropolyol has the structure of formula 1a:

Ia wherein each of $X_1$, $X_2$ and $X_3$ is independently a hydroxyl group or an optionally substituted OH terminated alkylene chain; and $X_4$ is H or as defined for $X_1$, $X_2$ and $X_3$.

9. A contact lens formed from a polyurethane polymer composition prepared by reacting a mixture comprising:
(a) 10 to 70 wt % of at least one polyethylene glycol having a number average molecular weight of 1000 or less and 10 to 70 wt % of at least one polyethylene glycol having a number average molecular weight of 3000 to 8000;
(b) 9 to 50 wt % of at least one di-isocyanate; and
(c) at least one polyol or at least one macropolyol having a functionality greater than 2, wherein the polyol or macropolyol is present at an amount of 0.1 to 5 wt % of the mixture;

wherein the macropolyol has the structure of 1b:

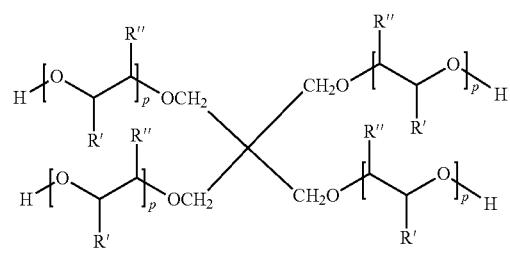
Ib wherein each p is from about 3 to about 25 and R' and R" represent H, more preferably, p is about 25.

* * * * *